(12) United States Patent
Shimizu et al.

(10) Patent No.: US 11,355,800 B2
(45) Date of Patent: Jun. 7, 2022

(54) BATTERY PACK

(71) Applicant: Panasonic Intellectual Property Management Co., Ltd., Osaka (JP)

(72) Inventors: Keisuke Shimizu, Osaka (JP); Shinya Motokawa, Hyogo (JP); Chifumi Murayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 128 days.

(21) Appl. No.: 16/640,342

(22) PCT Filed: Jan. 15, 2019

(86) PCT No.: PCT/JP2019/000821
§ 371 (c)(1),
(2) Date: Feb. 19, 2020

(87) PCT Pub. No.: WO2019/146438
PCT Pub. Date: Aug. 1, 2019

(65) Prior Publication Data
US 2020/0358152 A1 Nov. 12, 2020

(30) Foreign Application Priority Data

Jan. 25, 2018 (JP) .............................. JP2018-010433

(51) Int. Cl.
*H01M 10/658* (2014.01)
*H01M 10/613* (2014.01)
(Continued)

(52) U.S. Cl.
CPC ....... *H01M 10/658* (2015.04); *H01M 10/613* (2015.04); *H01M 10/647* (2015.04);
(Continued)

(58) Field of Classification Search
CPC ............. H01M 10/613; H01M 10/647; H01M 10/6555; H01M 10/6557; H01M 10/6561;
(Continued)

(56) References Cited

U.S. PATENT DOCUMENTS

| | | | |
|---|---|---|---|
| 2011/0159340 A1* | 6/2011 | Hu ..................... | H01M 10/6555 429/120 |
| 2013/0157089 A1* | 6/2013 | Miyatake .................. | B60L 7/22 429/72 |

FOREIGN PATENT DOCUMENTS

| | | |
|---|---|---|
| JP | 2010-055908 | 3/2010 |
| JP | 5960289 B | 8/2016 |

OTHER PUBLICATIONS

International Search Report of PCT application No. PCT/JP2019/000821 dated Mar. 26, 2019.

* cited by examiner

*Primary Examiner* — Lingwen R Zeng
(74) *Attorney, Agent, or Firm* — McDermott Will & Emery LLP (57) ABSTRACT

A battery pack includes first and second battery modules arranged in a first direction. In the first battery module, a first heat transfer part and a first heat insulator are disposed between battery cells adjacent in a second direction orthogonal to the first direction. In the second battery module, a second heat transfer part and a second heat insulator are disposed between battery cells adjacent in the second direction. The first heat transfer part constitutes a part of a heat transfer component that is put across and connected to both the first and the second battery modules. The first heat transfer part is connected to one of the battery cells in the first battery module so as to enable heat transfer. The second (Continued)

heat transfer part constitutes another part of the heat transfer component and is connected to one of the battery cells in the second battery module.

3 Claims, 7 Drawing Sheets

(51) Int. Cl.
    *H01M 10/647*     (2014.01)
    *H01M 10/6555*     (2014.01)
    *H01M 50/209*     (2021.01)
    *H01M 10/6561*     (2014.01)
    *H01M 10/6557*     (2014.01)
    *H01M 10/6567*     (2014.01)

(52) U.S. Cl.
    CPC .... *H01M 10/6555* (2015.04); *H01M 10/6557* (2015.04); *H01M 10/6561* (2015.04); *H01M 10/6567* (2015.04); *H01M 50/209* (2021.01); *Y02E 60/10* (2013.01)

(58) Field of Classification Search
    CPC ........... H01M 10/6567; H01M 10/658; H01M 50/209; Y02E 60/10
    See application file for complete search history.

BATTERY PACK

TECHNICAL FIELD

The present disclosure relates to a battery pack.

BACKGROUND ART

A conventionally known battery pack includes a plurality of battery modules. Further, the plurality of battery modules are formed independently of one another. For instance, PTL 1 describes a configuration in which a plurality of single cells (battery cells) that are prismatic batteries are disposed side by side with respective spacers therebetween, and long bind bars are disposed on both widthwise sides of the plurality of single cells. In this configuration, both ends of each bind bar are fixed to two end plates that are disposed at respective ends of an array of the plurality of single cells in a battery module. In the battery module, connection plates are disposed at both height-wise ends of the single cells, and both ends of each connection plate are fixed to the end plates. The plurality of battery modules are arranged in a height-wise direction, and an intermediate bracket is disposed between the adjacent battery modules. Both ends of the intermediate bracket are fixed to the end plates of the battery modules.

CITATION LIST

Patent Literature

PTL 1: Japanese Patent No. 5960289

SUMMARY OF THE INVENTION

A battery pack contains the battery modules that each include the plurality of the electrically connected single battery cells. If part of the battery cells in the battery pack abnormally generates heat in the event of an anomaly, a thermal impact may spread to the battery cells surrounding the abnormal battery cell. Thus, a possible countermeasure consists of installing a low-heat-conductive insulator as a separator between the adjacent battery cells in each of the battery modules to hinder the transmission of heat from the battery cell that has abnormally generated heat to the other battery cells. Unfortunately, this countermeasure does not provide a heat transfer route used to transmit heat from the battery cell that has abnormally generated heat to constituents of the battery pack other than the battery cells adjacent to the abnormal battery cell in the same battery module and thus requires a substantial amount of a heat insulating material to ensure that a thermal impact does not spread to the adjacent battery cells. This causes each of the battery modules and the battery pack to have a decreased energy density with respect to a constant entire volume.

There is a possibility that most of a surface of each of the battery cells is covered with a heat insulating material. As a result, heat generated from the battery cell by charging or discharging under normal use conditions is less likely to be released or discharged to an outside. This can cause temperature of the battery cell to get high and damage an electrical characteristic of the battery cell. Further, heat insulation is provided between the plurality of battery cells. This increases variation in temperature among the battery cells, causing a difference in battery characteristic.

A battery pack according to an aspect of the present disclosure includes a first battery module and a second battery module that are arranged side by side inside a pack case in a first direction, each of the first battery module and the second battery module including a plurality of battery cells arranged side by side in a second direction orthogonal to the first direction, in which in the first battery module, a first heat transfer part and a first heat insulator that are separate in the second direction are disposed between the battery cells adjacent to each other in the second direction, in which in the second battery module, a second heat transfer part and a second heat insulator that are separate in the second direction are disposed between the battery cells adjacent to each other in the second direction, in which the first heat transfer part constitutes a part of a heat transfer component that is put across and connected to both the first battery module and the second battery module, and the first heat transfer part is connected to one of the battery cells in the first battery module so as to enable heat transfer between the first heat transfer part and the one of the battery cells in the first battery module, and in which the second heat transfer part constitutes another part of the heat transfer component and is connected to one of the battery cells in the second battery module so as to enable heat transfer between the second heat transfer part and the one of the battery cells in the second battery module.

The battery pack according to the present disclosure can inhibit the spread of a thermal impact created when part of the battery cells abnormally generates heat, provide an increased energy density, and reduce variation in temperature among the battery cells under normal use conditions. Under normal use conditions, the battery pack can prevent the battery cells from reaching an excessively high temperature.

DESCRIPTION OF EMBODIMENT

A battery pack according to an example of an exemplary embodiment will be described below in detail. Drawings referenced in a description of the exemplary embodiment are schematically drawn, and dimensions and proportions of configuration elements illustrated in the drawings may differ from those of actual components. Thus, specific dimensions and proportions should be understood in view of the following description. In the description given herein, "substantially identical" means absolutely identical, as well as virtually identical, for example. Other words modified by "substantially" should be interpreted in the same manner. An "end" of an object means an edge and a surrounding portion of the object. Shapes, materials, piece counts, and other particulars described below are provided for the purpose of illustration and may be changed depending on specifications of battery packs. In the following description, identical or equivalent components are denoted by identical reference signs.

Figure 1:
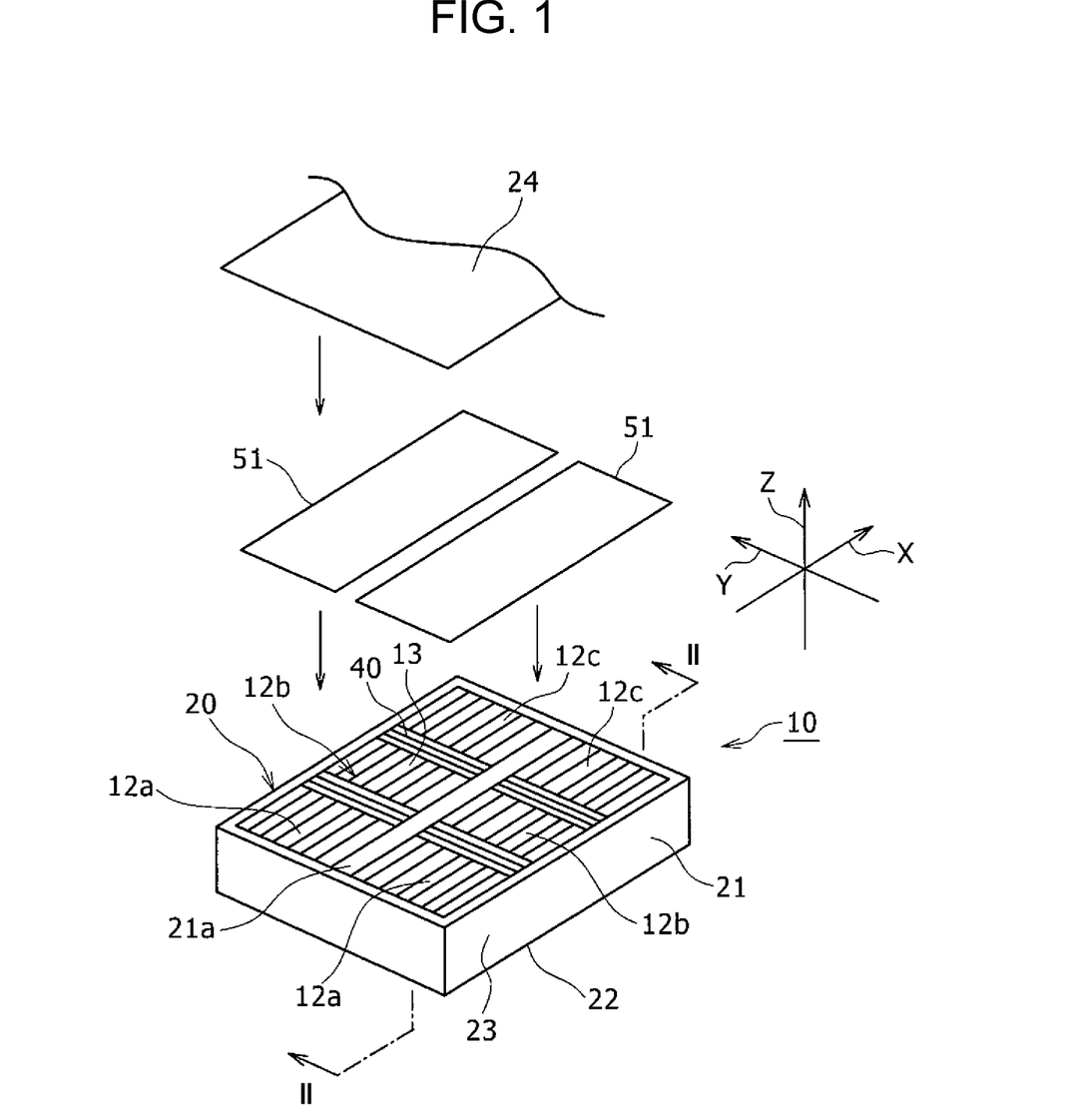
FIG. 1 is an exploded perspective view of a battery pack according to an example of an exemplary embodiment, with some components detached from the battery pack.
Figure 2:
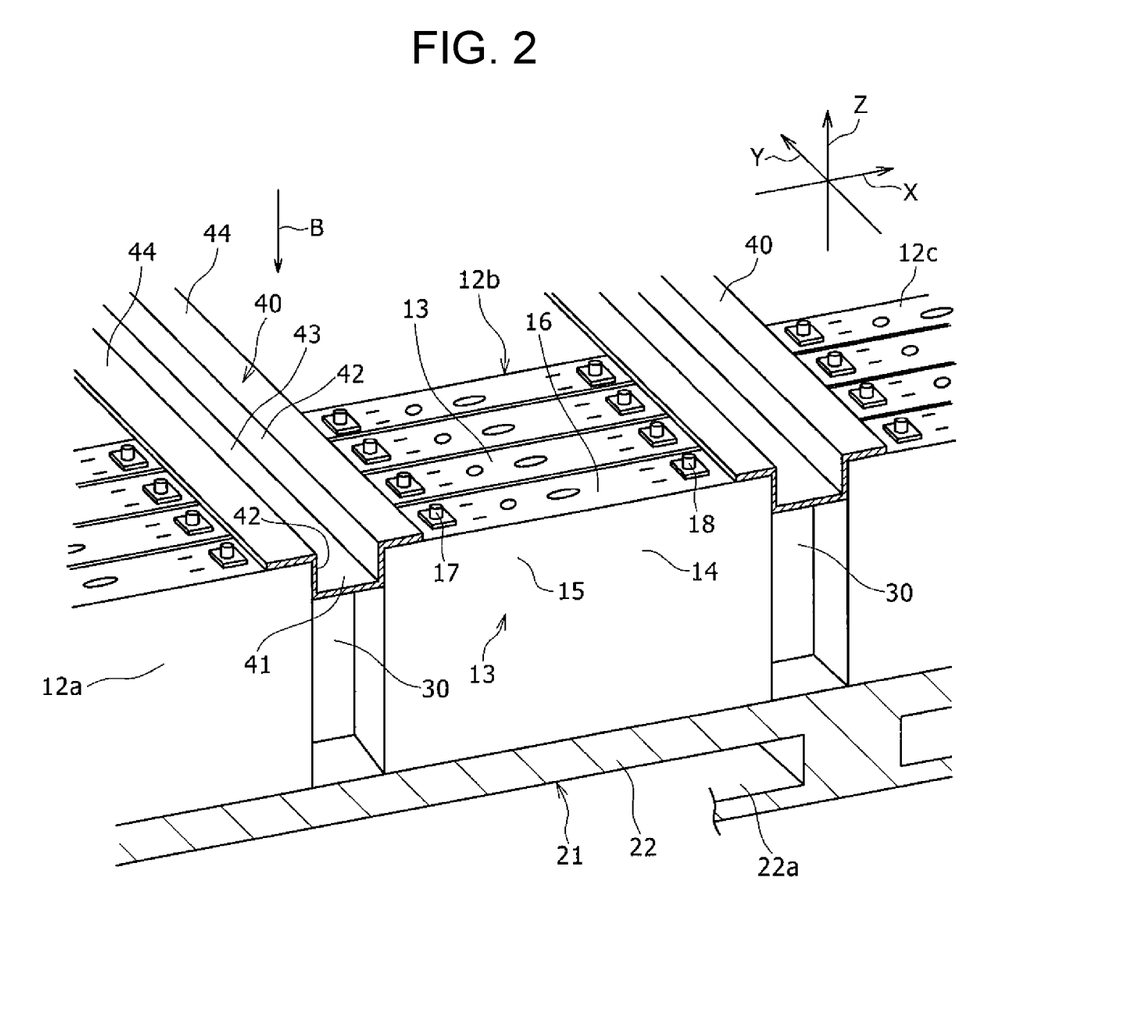
FIG. 2 is an enlarged perspective view of a cross section taken along line II-II of FIG. 1.
Figure 3:
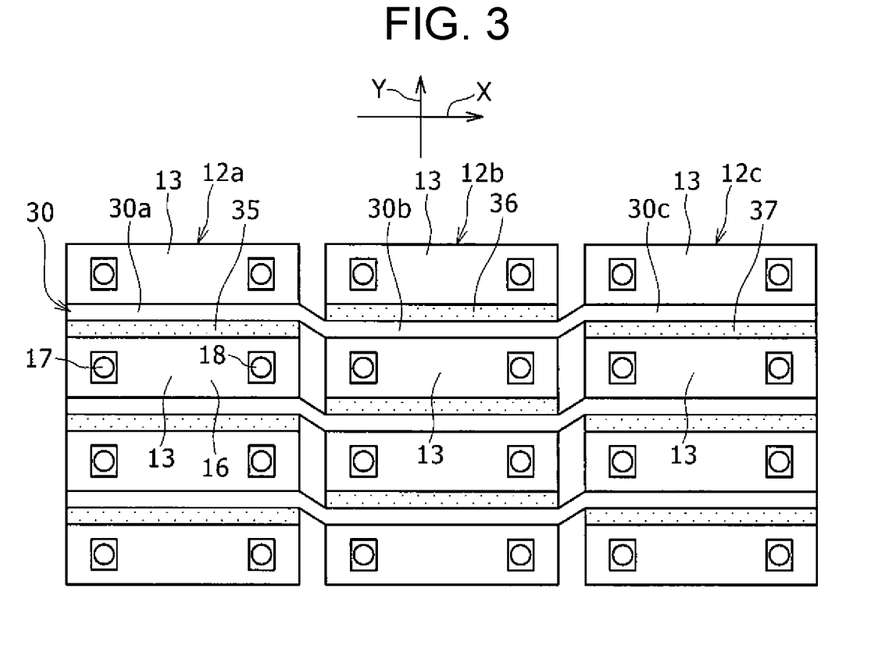
FIG. 3 is a schematic diagram viewed along arrow B in FIG. 2, with some components detached from the battery pack in FIG. 2.

FIG. 1 is an exploded perspective view of battery pack 10 with some components detached from battery pack 10. FIG. 2 is an enlarged perspective view of a cross section taken along line II-II of FIG. 1. FIG. 3 is a schematic diagram viewed along arrow B in FIG. 2, with some components detached from the battery pack in FIG. 2. Battery pack 10 includes two groups of first battery modules 12a, second battery modules 12b, and third battery modules 12c that are arranged such that the two groups of pluralities of the battery modules are divided from each other in longitudinal direction Y. Battery modules 12a, 12b, 12c in each group are arranged such that first battery module 12a, second battery module 12b, and third battery module 12c are aligned along lateral direction X that is a first direction. First battery module 12a and second battery module 12b are arranged side by side in lateral direction X, and second battery module 12b and third battery module 12c are arranged side by side in lateral direction X. Longitudinal direction Y is a second direction that is orthogonal to lateral direction X.

In one example, FIG. 1 illustrates a case in which three battery modules are adjacent to each other in each row in lateral direction X and two battery modules are adjacent to each other in each column in longitudinal direction Y. In FIGS. 1 to 3 and FIGS. 4 to 6 described later, a lateral direction is indicated by X, a longitudinal direction is indicated by Y, and a height direction orthogonal to both X and Y is indicated by Z.

Battery pack 10 includes pack case 20, the two groups of first, second and third battery modules 12a, 12b, 12c, and a plurality of side-binding bars 40. Pack case 20 has case body 21 and lid 24. Case body 21 has outer peripheral wall 23 erected on an entire edge of bottom plate 22 having a rectangular shape. Case body 21 has an aperture on a top. In the description given below, the aperture is formed on the top of case body 21 and bottom plate 22 is formed on a bottom of case body 21. The top and the bottom are terms used for the convenience of description.

Lid 24 has a rectangular, planar shape. Lid 24 is attached to an upper edge of case body 21 with bolts, for example, thereby covering the aperture to constitute pack case 20.

Partition plate 21a that extends in lateral direction X is fixed to an upper surface of bottom plate 22 of case body 21 at a center in longitudinal direction Y.

As illustrated in FIG. 1, the two groups of first battery modules 12a, second battery modules 12b, and third battery modules 12c are arranged in case body 21 such that the two groups are separated in two respective spaces divided by partition plate 21a. Hereafter, first battery module 12a, second battery module 12b, and third battery module 12c arranged in one of the spaces (diagonally lower right in FIG. 1) divided by partition plate 21a in case body 21 will be described.

As illustrated in FIG. 2, each battery module 12a, 12b, 12c includes battery cells 13, a plurality of single cells, that are arranged side by side with respective heat transfer components and heat insulators, which are described later, interposed therebetween in longitudinal direction Y. As illustrated in FIG. 3, battery modules 12a, 12b, 12c are connected by heat transfer component 30 put across the adjacent battery modules. Specifically, in first battery module 12a, first heat transfer part 30a of heat transfer component 30 and first heat insulator 35 that are separate in longitudinal direction Y are disposed between adjacent battery cells 13 in longitudinal direction Y. First heat transfer part 30a is disposed at a first side (an upper side in FIG. 3) between battery cells 13 in longitudinal direction Y, whereas first heat insulator 35 is disposed at a second side (a lower side in FIG. 3) between battery cells 13 in longitudinal direction Y. In FIG. 3, first heat insulator 35 and second and third heat insulators 36, 37 described later are indicated by a sandy pattern.

Heat transfer component 30 is a long plate-shaped member that is made of a metallic material or other material with high thermal conductivity, such as iron or aluminum alloy. Heat transfer component 30 has a bend that is between adjacent battery modules 12a, 12b, 12c and that is tilted relative to longitudinal direction Y. A thermal conductivity of heat transfer component 30 is greater than or equal to 45 W/m K at 25° C., for example. First heat transfer part 30a is a planar part made up of a lengthwise end (a left end in FIG. 3) of heat transfer component 30. Thus, first heat transfer part 30a constitutes a part of heat transfer component 30 and is connected to a side surface of battery cell 13 in first battery module 12a in longitudinal direction Y by, for example, being put into contact with the side surface such that heat is transferable.

First heat insulator 35 is a plate-shaped member that is made of a material with low thermal conductivity, such as rubber, a resin, or mica. A thermal conductivity of first heat insulator 35 is lower than the thermal conductivity of heat transfer component 30 and lower than a thermal conductivity of pack case 20. The thermal conductivity of first heat insulator 35 is, for example, less than 0.8 W/m K at 25° C.

In second battery module 12b, second heat transfer part 30b of heat transfer component 30 and second heat insulator 36 that are separate in longitudinal direction Y are disposed between adjacent battery cells 13 in longitudinal direction Y. Second heat transfer part 30b is disposed at the second side (the lower side in FIG. 3) between battery cells 13 in longitudinal direction Y, whereas second heat insulator 36 is disposed at the first side (the upper side in FIG. 3) between battery cells 13 in longitudinal direction Y.

Second heat transfer part 30b is a planar part made up of a lengthwise intermediate portion of heat transfer component 30. Thus, second heat transfer part 30b constitutes another part of heat transfer component 30 different from first heat transfer part 30a and is connected to a side surface of battery cell 13 in second battery module 12b in longitudinal direction Y by, for example, being put into contact with the side surface such that heat is transferable. Second heat insulator 36 is a plate-shaped member that is made of a material with low thermal conductivity, such as rubber, a resin, or mica. A thermal conductivity of second heat insulator 36 is lower than the thermal conductivity of heat transfer component 30 and lower than the thermal conductivity of pack case 20. The thermal conductivity of second heat insulator 36 is, for example, less than 0.8 W/m K at 25° C.

In third battery module 12c, third heat transfer part 30c of heat transfer component 30 and third heat insulator 37 that are separate in longitudinal direction Y are disposed between adjacent battery cells 13 in longitudinal direction Y. Third heat transfer part 30c is disposed at the first side (the upper side in FIG. 3) between battery cells 13 in longitudinal direction Y, whereas third heat insulator 37 is disposed at the second side (the lower side in FIG. 3) between battery cells 13 in longitudinal direction Y.

Third heat transfer part 30c is a planar part made up of another lengthwise end (a right end in FIG. 3) of heat transfer component 30. Thus, third heat transfer part 30c constitutes another part of heat transfer component 30 different from first heat transfer part 30a and second heat transfer parts 30b and is connected to a side surface of battery cell 13 in third battery module 12c in longitudinal direction Y by, for example, being put into contact with the side surface such that heat is transferable.

Battery cell 13 to which first heat transfer part 30a of heat transfer component 30 is connected so as to enable heat transfer in first battery module 12a, and battery cell 13 to which second heat transfer part 30b is connected so as to enable heat transfer in second battery module 12b, are disposed at places that differ in longitudinal direction Y. Battery cell 13 to which third heat transfer part 30c is connected so as to enable heat transfer in third battery module 12c, and battery cell 13 to which second heat transfer part 30b is connected so as to enable heat transfer in second battery module 12b are disposed at places that differ in longitudinal direction Y.

Third heat insulator 37 is a plate-shaped member that is made of a material with low thermal conductivity, such as rubber, a resin, or mica. A thermal conductivity of third heat insulator 37 is lower than the thermal conductivity of heat transfer component 30 and lower than the thermal conductivity of pack case 20. The thermal conductivity of third heat insulator 37 is, for example, less than 0.8 W/m·K at 25° C. First heat insulator 35, second heat insulator 36, and third heat insulator 37 may be made of an identical material and may have an identical thermal conductivity.

In the present exemplary embodiment, first heat transfer part 30a, second heat transfer part 30b, and third heat transfer part 30c and the bends each between the heat transfer parts included in heat transfer component 30 are made of a long single-piece plate-shaped member. However, the configuration in the present disclosure is not limited to this example. First heat transfer part 30a, second heat transfer part 30b, and third heat transfer part 30c may be made up of respective separate plate-shaped members. In this case, first heat transfer part 30a, second heat transfer part 30b, and third heat transfer part 30c may be integrated together such that first heat transfer part 30a, second heat transfer part 30b, and third heat transfer part 30c are connected by connection members that differ from each of the bends between the heat transfer parts and that are made of a material with a thermal conductivity higher than the thermal conductivity of heat insulators 35, 36, 37.

The heat transfer component may be a graphite sheet. The graphite sheet is a material that is crystallized by graphitizing a polyimide or other polymer film through high-temperature heating. The graphite sheet is thin and offers improved flexibility and substantially high thermal conductivity. Further, in each battery module, an insulating member such as insulating sheet or an insulating film may be disposed between the heat transfer component and the battery cell. An insulating film may be stuck on at least a surface of the heat transfer component that comes into contact with the battery cell.

Each of first heat insulator 35, second heat insulator 36, and third heat insulator 37 may be a heat-insulating sheet that has a structure in which a porous material such as silica xerogel is supported between fibers of a fiber sheet made of non-woven fabric or the like. The heat-insulating sheet has a thermal conductivity ranging approximately from 0.018 W/m·K to 0.024 W/m·K, which is lower than the thermal conductivity of general rubber and resins. Hence, the heat-insulating sheet is suitable for inhibiting the spread of heat from a battery cell that has abnormally generated heat to battery cells adjacent to the abnormal battery cell in a laminating direction.

Each battery cell 13 is a prismatic (=rectangular), dischargeable secondary battery. Examples of the secondary battery include lithium-ion batteries. Alternatively, the secondary battery may be another battery such as a nickel metal hydride battery. As illustrated in FIG. 2, each battery cell 13 includes: cell case 14 that has a cuboid shape or a rectangular parallelepiped shape; and an electrode assembly (not illustrated) contained in cell case 14 together with electrolyte. Cell case 14 is formed by covering an upper aperture of box-shaped cell case body 15 with sealing plate 16. The electrode assembly is formed by alternately laminating (or stacking) positive-electrode and negative-electrode plates with separators therebetween. Positive-electrode terminal 17 and negative-electrode terminal 18 protrude from respective ends of sealing plate 16 in a lengthwise direction. Positive-electrode terminal 17 is connected to the positive-electrode plate, whereas negative-electrode terminal 18 is connected to the negative-electrode plate.

As described above, the plurality of battery cells 13 in each battery module 12 are arranged side by side with respective heat transfer components 30 and the heat insulators interposed therebetween in longitudinal direction Y. Further, in the lengthwise direction of sealing plates 16, the positions of positive-electrode terminals 17 and negative-electrode terminals 18 on adjacent battery cells 13 are opposite to each other. The positive-electrode terminal and negative-electrode terminal adjacent to each other on adjacent battery cells 13 in longitudinal direction Y are connected together via bus bars (not illustrated), so that the plurality of battery cells 13 are electrically connected in series.

Alternatively, of the plurality of battery cells 13, the positive-electrode terminals may be disposed at one ends of sealing plates 16 in the lengthwise direction, and the negative-electrode terminals may be disposed at the other ends of sealing plates 16 in the lengthwise direction. Further, the plurality of positive-electrode terminals disposed side by side in longitudinal direction Y may be connected together via a bus bar, whereas the plurality of negative-electrode terminals disposed side by side in longitudinal direction Y may be connected together via another bus bar. In this way, the plurality of battery cells may be electrically connected together in parallel. Alternatively, some of the plurality of battery cells are electrically connected in parallel to form a battery cell group. Then, a plurality of battery cell groups formed in this manner may be electrically connected in series.

Bottom plate 22 of pack case 20 functions as a cooling plate to cool battery modules 12a, 12b, 12c. For example, coolant passages 22a through which coolant such as air or water flows are formed at a plurality of locations in bottom plate 22. Coolant passages 22a are connected to a coolant flow path (not illustrated) outside battery pack 10. FIG. 1 does not illustrate the coolant passages provided in bottom plate 22. It should be noted that the coolant passages do not necessarily have to be formed in the bottom plate.

Alternatively, for example, a shape or material that exhibits a good radiation performance may be used for the bottom plate.

As illustrated in FIG. 2, the plurality of side-binding bars 40 are pushed into and fixed in respective apertures between adjacent battery modules 12a, 12b, 12c arranged as described above. Each side-binding bar 40 that is long in longitudinal direction Y includes insertion section 41 and two flanges 44. Insertion section 41 includes: two aperture-side walls 42 parallel to each other; and aperture-side joint 43 that joins one edges of two aperture-side walls 42 together. Each of aperture-side walls 42 and aperture-side joint 43 has a planar shape. Two flanges 44 extend outwardly in a width direction from the other edges, or upper edges, of two aperture-side walls 42. Each side-binding bar 40 may be made of a metal or a resin, for example. If side-binding bar 40 is, for example, made of a metal, such as iron, steel, aluminum alloy, or stainless-steel alloy, each side-binding bar 40 and battery modules 12a, 12b, 12c are electrically insulated from each other by, for example, an insulating sheet interposed therebetween or the use of side-binding bar 40, a surface of which facing the battery cells is covered with an insulating layer.

A plate- or film-shaped member having an insulating property may be disposed between each side-binding bar 40 and battery cells 13.

With reference back to FIG. 1, case body 21 accommodates the two groups of first, second and third battery modules 12a, 12b, 12c and side-binding bars 40. In this state, circuit boards 51 having flexibility are disposed on upper sides of first, second and third battery modules 12a, 12b, 12c which correspond to regions over the two spaces defined by partition plate 21a, with an upper insulating paper sheet (not illustrated) interposed between the circuit boards and the battery modules. Mounted on each circuit board 51 are a central processing unit (CPU), memory, and other components. Circuit boards 51 are connected to positive-electrode terminals 17 (see FIG. 2) of corresponding battery cells 13 and monitor voltages applied across individual battery cells 13.

Furthermore, in order to measure temperatures of battery cells 13, circuit boards 51 may be connected to temperature measuring units that are in contact with the positive-electrode or negative-electrode terminals or bus bars connected to the positive-electrode or negative-electrode terminals. Lid 24 is coupled to case body 21 so as to cover upper surfaces of circuit boards 51. Optionally, the circuit boards may be disposed outside pack case 20.

In response to heat abnormally generated by part of battery cells 13, battery pack 10 described above can inhibit the spread of a thermal impact because of heat insulators 35, 36, 37 that are each disposed between battery cells 13 adjacent to each other in longitudinal direction Y in battery modules 12a, 12b, 12c.

Further, owing to heat transfer component 30 that is connected to two battery cells 13 in adjacent battery modules 12a, 12b, 12c to enable heat transfer, the plurality of battery cells 13 can share the load of alleviating a thermal impact created when battery cell 13 abnormally generates heat. This suppresses the temperature of part of battery cells 13 from intensively rising. Heat that is transferred from abnormally-heat-generating battery cell 13 in one of the battery modules to battery cells 13 in the other battery modules adjacent to the one battery module is encouraged to further spread to surrounding battery cells and parts. This enlarges an area where heat can be radiated and thus reduces a thermal impact spread from the abnormal battery cell. This configuration also contributes to a reduced required volume of heat insulators 35, 36, 37 and thus enables battery pack 10 to have an increased energy density. Moreover, this configuration facilitates the transfer of heat between battery cells 13 in the adjacent battery modules and the radiation of heat to peripheral parts of the battery modules under normal use conditions. This prevents battery cells 13 from reaching an excessively high temperature and reduces variation in temperature among battery cells 13 especially in lateral direction X.

Battery cell 13 to which first heat transfer part 30a is connected so as to enable heat transfer in first battery module 12a, and battery cell 13 to which second heat transfer part 30b is connected so as to enable heat transfer in second battery module 12b, are disposed at places that differ in longitudinal direction Y. As a result, under normal use conditions, battery pack 10 can reduce variation in temperature among battery cells 13 both in lateral direction X and in longitudinal direction Y.

Figure 4:
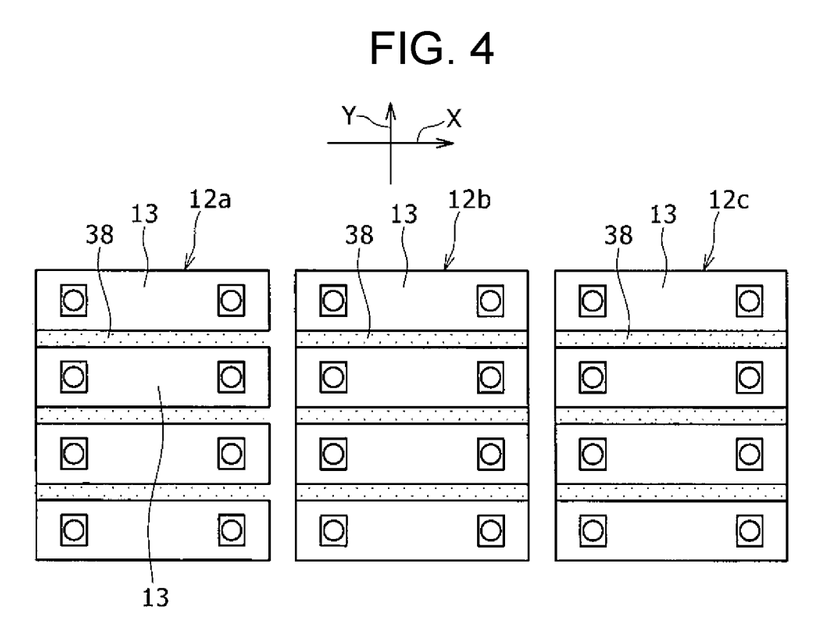
FIG. 4 is a diagram comparable to FIG. 3, illustrating a battery pack according to a comparative example.

FIG. 4 is a diagram comparable to FIG. 3, illustrating a battery pack according to a comparative example. In each of first, second and third battery modules 12a, 12b, 12c, in this comparative example, heat insulators 38 are each disposed between adjacent battery cells 13, but a heat transfer component connected to the adjacent battery modules is not disposed between the battery cells. Consequently, battery cells 13 in first, second and third battery modules 12a, 12b, 12c are not thermally connected to each other. This results in an increased required volume of heat insulators 38 that are used to inhibit the spread of a thermal impact created when part of battery cells 13 abnormally generates heat. This in turn reduces the energy density of the battery pack. The variation in temperature among battery cells 13 under normal use conditions increases. The battery pack in the exemplary embodiment of FIGS. 1 to 3 avoids such disadvantages.

Figure 5:
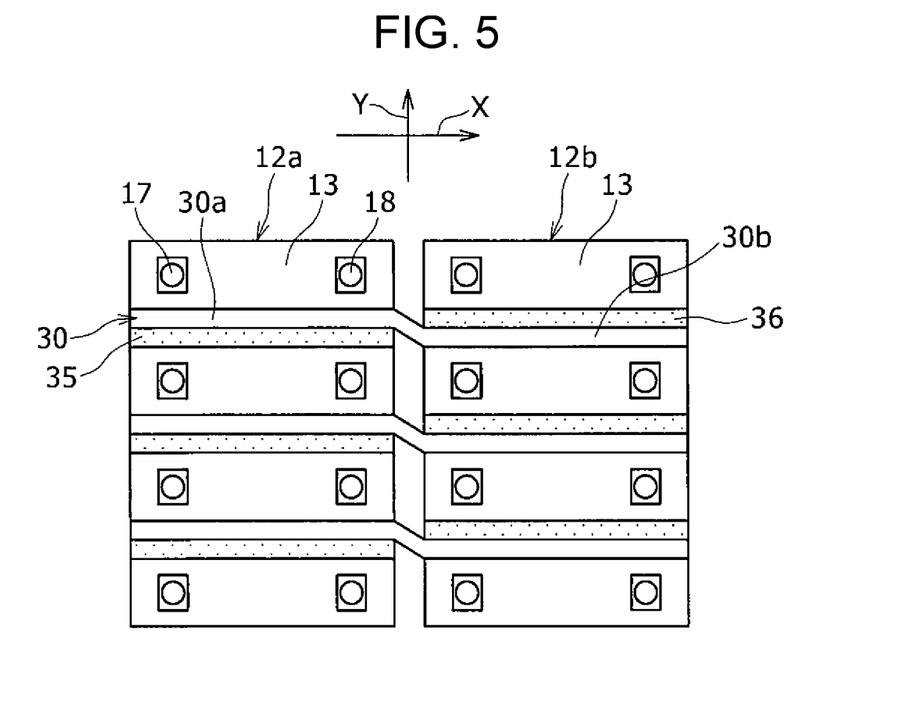
FIG. 5 is a diagram comparable to FIG. 3, illustrating a battery pack according to another example of the exemplary embodiment.

FIG. 5 is a diagram comparable to FIG. 3, illustrating a battery pack according to another example of the exemplary embodiment. In the battery pack of this example, as compared with the configuration illustrated in FIGS. 1 to 3, first and second battery modules 12a, 12b are arranged in each of two spaces divided by partition plate 21a (see FIG. 1) in pack case 20 (see FIG. 1) although the third battery module is not arranged.

In such a configuration illustrated in FIG. 5, as compared with the configuration illustrated in FIGS. 1 to 3, an area to which heat can be radiated from abnormally-heat-generating battery cell 13 is smaller. Nevertheless, battery cells 13 in first and second battery modules 12a, 12b are connected to each other by heat transfer component 30 so as to enable heat transfer. This configuration can produce effects of inhibiting the spread of a thermal impact created when part of battery cells 13 abnormally generates heat, increasing the energy density of the battery pack, and reducing the variation in temperature among battery cells 13 under normal use conditions. Apart from the description above, this example is similar in configuration and action to the example illustrated in FIGS. 1 to 3.

Figure 6:
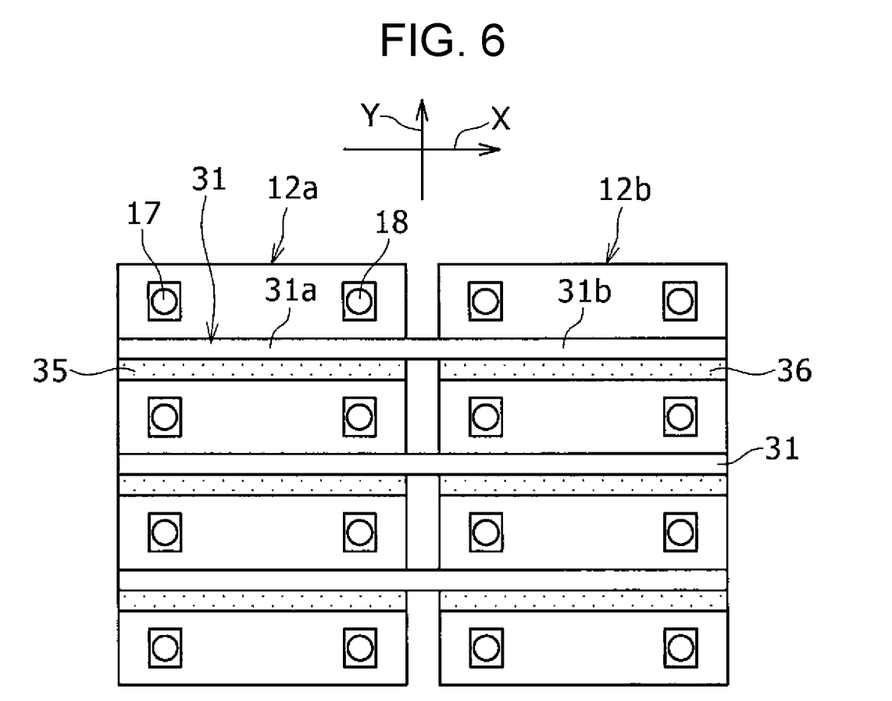
FIG. 6 is a diagram comparable to FIG. 3, illustrating a battery pack according to another example of the exemplary embodiment.

FIG. 6 is a diagram comparable to FIG. 3, illustrating a battery pack according to another example of the exemplary embodiment. In the battery pack of this example, as compared with the configuration illustrated in FIG. 5, heat transfer component 31 has a planer shape and is connected to battery cells 13 in first and second battery modules 12a, 12b so as to enable heat transfer between the battery cells, which are disposed at places that coincide in longitudinal direction Y. Specifically, first heat transfer part 31a, a first part of heat transfer component 31, is connected to a first surface (a lower surface in FIG. 6) of battery cell 13 in first battery module 12a, and second heat transfer part 31b, a second part of heat transfer component 31, is connected to the first surface of battery cell 13 in second battery module 12b so as to enable heat transfer between the battery cells.

In such a configuration illustrated in FIG. 6, battery cells 13 in first and second battery modules 12a, 12b are connected to each other by heat transfer component 31 so as to enable heat transfer. Meanwhile, the effect of reducing variation in temperature among battery cells 13 both in lateral direction X and in longitudinal direction Y under normal use conditions is less powerful in the configuration of FIG. 6 than in the configuration of FIG. 5. Apart from the description above, this example is similar in configuration and action to the examples illustrated in FIGS. 1 to 3 and 5.

Figure 7:
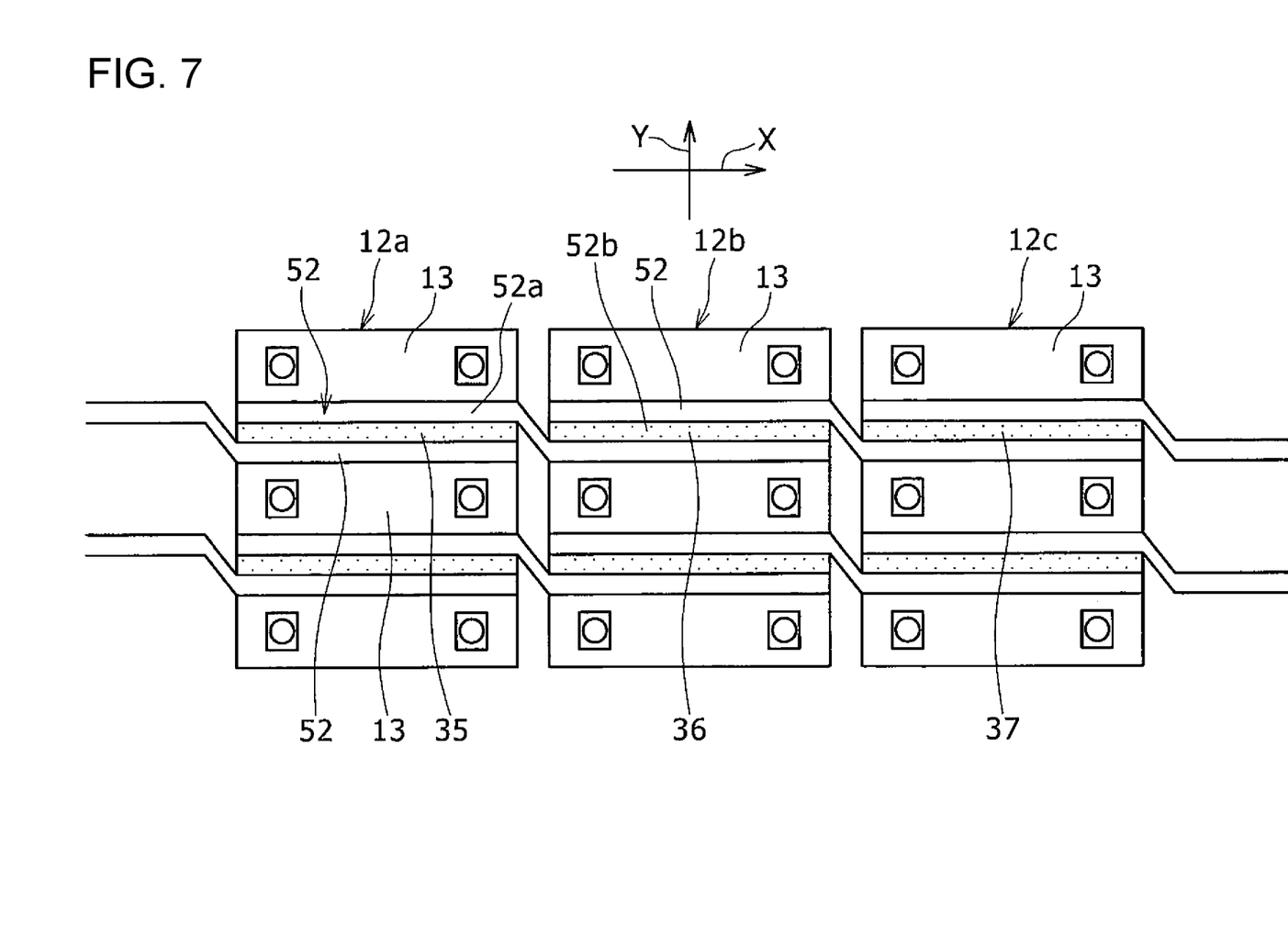
FIG. 7 is a diagram comparable to FIG. 3, illustrating a battery pack according to another example of the exemplary embodiment.

FIG. 7 is a diagram comparable to FIG. 3, illustrating a battery pack according to another example of the exemplary embodiment. The battery pack of this example, as compared with the configuration illustrated in FIGS. 1 to 3, further includes fourth and fifth battery modules (not illustrated) on both sides of first, second and third battery modules 12a, 12b, 12c in lateral direction X. In each battery module 12a, 12b, 12c, two heat transfer components 52 and one of first heat insulator 35, second heat insulator 36, and third heat insulator 37 that is put between two heat transfer components 52 are disposed between adjacent battery cells 13.

Heat transfer component 52 is connected only to battery cells 13 in two of battery modules 12a, 12b, 12c that are adjacent to each other in lateral direction X so as to enable heat transfer. Specifically, in one of the adjacent battery modules (the left-side battery module in FIG. 7), a heat transfer part that is a first part (a left part in FIG. 7) of heat transfer component 52 is connected to a first surface (a lower surface in FIG. 7) of battery cell 13 in longitudinal direction Y so as to enable heat transfer. In the other of the adjacent battery modules (the right-side battery module in FIG. 7), another heat transfer part that is a second part (a right part in FIG. 7) of heat transfer component 52 is connected to a second surface (an upper surface in FIG. 7) of battery cell 13 at a place that is not on one side in longitudinal direction Y so as to enable heat transfer. For instance, in first battery module 12a of first and second battery modules 12a, 12b, first heat transfer part 52a, the first part (the left part in FIG. 7) of heat transfer component 52, is connected to the first surface (the lower surface in FIG. 7) of battery cell 13 in longitudinal direction Y so as to enable heat transfer. In second battery module 12b, second heat transfer part 52b, the second part (the right part in FIG. 7) of heat transfer component 52, is connected to the second surface (the upper surface in FIG. 7) of battery cell 13 at a place that is not on one side (that is on a lower side in FIG. 7) in longitudinal direction Y so as to enable heat transfer.

In each of the fourth and fifth battery modules, a part of one heat transfer component 52 and a heat insulator (not illustrated) are disposed between adjacent battery cells (not illustrated). Heat transfer component 52 is disposed on only one of a first side (an upper side in FIG. 7) and a second side (a lower side in FIG. 7) of the heat insulator.

According to the configuration described above, battery cells 13 in first to fifth battery modules 12a, 12b, 12c are thermally connected together in an enlarged area in longitudinal direction Y. This configuration allows the battery pack to further reduce variation in temperature among battery cells 13 in longitudinal direction Y under normal use conditions. Apart from the description above, this example is similar in configuration and action to the example illustrated in FIGS. 1 to 3.

In the examples of the exemplary embodiment described above, the battery cells are prismatic batteries. This, however, should not be construed to limit the scope of the present disclosure. The battery cells may be any batteries, such as cylindrical batteries and pouch batteries, other than the prismatic batteries.

The invention claimed is:

1. A battery pack comprising a first battery module and a second battery module that are arranged side by side inside a pack case in a first direction,
   each of the first battery module and the second battery module including a plurality of battery cells arranged side by side in a second direction orthogonal to the first direction,
   wherein in the first battery module, a first heat transfer part and a first heat insulator that are separate in the second direction are disposed between the battery cells adjacent to each other in the second direction,
   wherein in the second battery module, a second heat transfer part and a second heat insulator that are separate in the second direction are disposed between the battery cells adjacent to each other in the second direction,
   wherein the first heat transfer part constitutes a part of a heat transfer component that is put across and connected to both the first battery module and the second battery module, and the first heat transfer part is connected to one of the battery cells in the first battery module so as to enable heat transfer between the first heat transfer part and the one of the battery cells in the first battery module,
   wherein the second heat transfer part constitutes another part of the heat transfer component and is connected to one of the battery cells in the second battery module so as to enable heat transfer between the second heat transfer part and the one of the battery cells in the second battery module,
   the first heat transfer part and the second heat transfer part are arranged in a staggered manner and are in continuous connection with each other, and
   the first heat insulator and the second heat insulator contact alternating surfaces of the corresponding first and second heat transfer parts in the respective first battery module and the second battery module.

2. The battery pack according to claim 1, wherein a thermal conductivity of the heat transfer component is higher than a thermal conductivity of each of the first heat insulator and the second heat insulator.

3. The battery pack according to claim 1, wherein the one of the battery cells in the first battery module to which the first heat transfer part is connected so as to enable heat transfer between the first heat transfer part and the one of the battery cells in the first battery module, and the one of the battery cells in the second battery module to which the second heat transfer part is connected so as to enable heat transfer between the second heat transfer part and the one of the battery cells in the second battery module, are disposed at places that differ in the second direction.

* * * * *